May 5, 1931. M. F. BATES 1,803,834
POWER TRANSMISSION
Filed Aug. 9, 1927
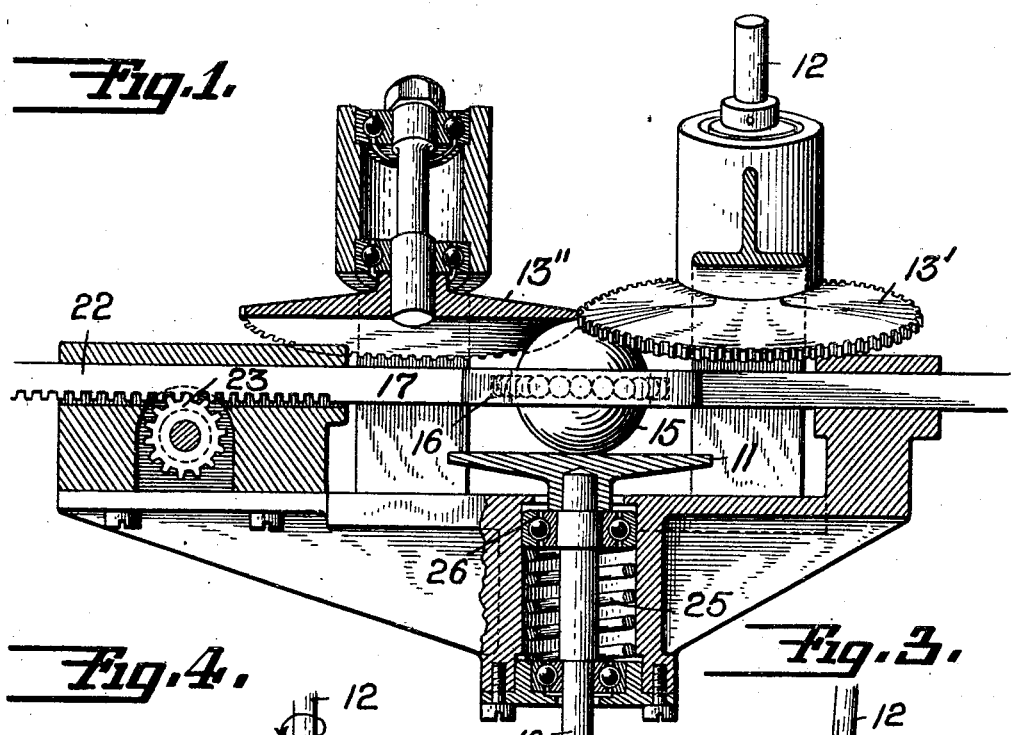
INVENTOR
Mortimer F. Bates.
BY
Herbert H. Thompson
his ATTORNEY.

Patented May 5, 1931

1,803,834

UNITED STATES PATENT OFFICE

MORTIMER F. BATES, OF BROOKLYN, NEW YORK, ASSIGNOR, BY MESNE ASSIGNMENTS, TO SPERRY GYROSCOPE COMPANY, INC., A CORPORATION OF NEW YORK

POWER TRANSMISSION

Application filed August 9, 1927. Serial No. 211,655.

This invention relates to variable speed power transmitting mechanisms and more particularly to transmitting mechanisms in which power is transmitted through a plurality of parts in rolling contact.

One of the objects of the invention is to provide a power transmission of this character by which changes in the speed or direction of the driving or driven elements may be readily accomplished without any slippage of the power transmitting parts and by which these changes in speed may be effected without releasing the pressure between the various elements of the transmission. I am aware that it has heretofore been proposed to accomplish this object by interposing between the driving and driven elements a plurality of balls or other rolling members which may then be operated as a single unit without interrupting the drive or disconnecting any of the parts. By my invention, however, I accomplish the same result by the use of a single ball or rolling member between the driving and driven elements. I am enabled to do this by utilizing a unique and entirely novel principle not heretofore employed in such power transmissions.

It is a further object of my invention to provide a power transmission of the rolling contact type employing the novel principle mentioned above and which may be applied to driving a member in either of two directions from a driving member rotating continuously in one direction, and in varying the speed ratio of the drive between any desired limits in either of said directions.

Still further objects and advantages of this invention will be set forth in the following detailed description.

In the accompanying drawings

Fig. 1 is a front elevation, partly sectioned vertically, showing one embodiment of my invention for the purpose of actuating a driven member in either of two directions.

Fig. 2 is an end elevation of the Fig. 1 form of my invention.

Fig. 3 is an end elevation, partly sectioned vertically, of another embodiment of my invention for the purpose of operating a driven member in a single direction with respect to the driving member.

Fig. 4 is a front elevation of the Fig. 3 form of my invention.

Referring to Figs. 3 and 4 of my invention which more clearly illustrates the fundamental principle involved, I have shown a driving shaft 10 carrying a friction disc 11 at its end and adapted to drive a driven shaft 12 carrying a friction disc 13 in cooperative relation to friction disc 11. The drive between discs 11 and 13 is effected by means of a ball 15 interposed between said discs, said ball being mounted within a ball retainer or cage 16 encircling the same, said retainer forming a part of an operating carriage 17, which may be operated radially on said discs parallel to the paper in Fig. 4 and normal to the paper in Fig. 3. The shafts 10 and 12 are offset so that movement of ball 15 inwardly on disc 11 causes said ball to move outwardly on disc 13, while movement of said ball outwardly on disc 11 moves said ball inwardly on disc 13. In this manner it will be readily understood the gear ratio for obtaining greater or lesser speeds from zero to maximum may be obtained.

It will readily be appreciated that if discs 11 and 13 were parallel to each other they would be tangent to the ball 15 at the ends of a diameter 20 of said ball. The ball would, therefore, be rotated or spun about said diameter as shaft 10 drove disc 13 through said ball. Any movement of said ball between said discs would, therefore, have to be a sliding movement, the ends of the diameter of said ball being in sliding contact with the discs 11 and 13. It will be understood that pressure is maintained on said ball by means such as a spring 25 (see Fig. 1) pressing upwardly on the upper slidably mounted bearing 26 of said shaft. As a result it would be extremely difficult and require the expenditure of a great deal of force to vary the position of said ball 15 with respect to said discs.

To remedy this objection, it has been proposed to substitute two balls of two rollers or various combinations of balls and rollers for the single ball shown in Figs. 3 and 4, in this way obtaining rolling contact, which necessitates little force to operate. I, however, propose the entirely novel method of obtaining rolling contact between the single ball and said discs. For this purpose I do not mount discs 11 and 13 parallel to each other but incline said discs several degrees, say 5 to 10 degrees with respect to each other, so that said discs are tangent to said driving ball, not at the ends of diameter 20 but at points a, b, subtending an angle less than 180 degrees. It will thus be seen that I have in effect formed a trough and that the ball is in rolling contact with said trough, because in operating the carriage 17 in a line parallel to said trough axis, that is, parallel to the paper in Fig. 4, or perpendicular to the paper in Fig. 3, the points a and b describe small polar circles as the ball rolls along said trough. By this means I have substituted rolling contact for sliding contact and thus made it possible to vary the position of ball 15 with respect to said discs by the expenditure of very little force and without interrupting the drive from shaft 10 to shaft 12.

The form of invention disclosed in Figs. 3 and 4, it will be observed, provides only for rotating shaft 12 in a single direction as long as shaft 10 operates in a single direction and reversal is impossible unless shaft 10 is reversed. Shaft 10 may, however, be the driving shaft of a constant speed motor operating always in a single direction, and it may be desirable to vary the direction of rotation of shaft 12. To make this possible, I have disclosed a modified form of my invention in Figs. 1 and 2. Here again the driving shaft 10 is seen with its disc 11 at its upper end spring-pressed into engagement with ball 15. Instead of a single disc 13, however, I have provided two disc 13'—13" having skew gear teeth around their peripheries and meshing at a point of contact substantially in the central axis of shaft 10. Said discs are inclined like disc 13 but in opposite directions. The reason for this is as follows: Referring again to Fig. 3 it will be seen that I prefer to drive the shaft 10 in such direction that ball 15 is normally actuated into the narrow end of the trough and in this manner counterbalance side thrust on cage 16 by disc contact pressure of spring 25, which would ordinarily tend to press the ball toward the wide end of the trough. Now when ball 15 is actuated to the other side of the axis of shaft 10, the ball is being pressed in the opposite direction, that is, in a direction normally reverse of that shown in Fig. 3. For this reason disc 13" is inclined in the other direction so that when the ball 15 crosses the center of disc 11 to the other side thereof, ball 15 will again be pressed toward the narrow end of the trough formed by discs 11 and 13'. By means of the gearing between discs 13' and 13", it will be apparent that when ball 15 is operated to the other side of the axis of shaft 10 into engagement with disc 13", the direction of rotation of shaft 12 will be reversed accordingly because of the gear connection between discs 13' and 13". The movement of carriage 17 may be effected by means of a rack and pinion 22—23, said pinion 23 being mounted on a shaft which may be provided with an operating handle.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a power transmission, a driving element, a driven element, a disc carried by each of said elements, a single ball interposed between said disc in driving engagement therewith, means for shifting said ball said discs being inclined relative to each other so as to engage said ball at points other than the ends of a diameter so that said ball is in rolling contact with said discs when shifted with respect thereto.

2. In a power transmission, a driving element, a driven element, a disc carried by each of said elements, a single ball interposed between said discs in driving engagement therewith, means for shifting said ball said discs being inclined relative to each other to form a trough, said ball being positioned with respect to said driving disc so that it is forced thereby toward the narrow end of said trough.

3. In a power transmission, a driving element, a plurality of driven elements, a single ball engaging said driving element and operable into driving engagement with one or the other of said driven elements, said driven elements being disposed on opposite sides of the axis of said driving element and inter-connected so as to be driven in opposite directions thereby, and means whereby said ball is in rolling contact with said elements when shifted with respect thereto.

4. In a power transmission, a driving element, a plurality of driven elements, a single ball engaging said driving element and operable into driving engagement with one or the other of said driven elements, said driven elements being disposed on opposite sides of the axis of said driving element and inter-connected so as to be driven in opposite directions thereby, said elements being so positioned with respect to each other and to the axis of said ball that said ball is in rolling contact with said elements when shifted with respect thereto.

5. In a power transmission, a driving element, a plurality of driven elements, each of said elements being provided with a disc, a single ball engaging said driving disc and operable into engagement with one or the other of said driven discs, said driven discs being disposed on opposite sides of the axis of said driving disc and inter-connected so as to be driven in opposite directions thereby, said driving and driven discs being inclined to each other to engage said ball at points other than the ends of a diameter thereof whereby said ball is in rolling contact with said disc when shifted with respect thereto.

6. In a power transmission, a driving element, a plurality of driven elements, each of said elements being provided with a disc, a single ball engaging said driving disc and operable into engagement with one or the other of said driven discs, said driven discs being disposed on opposite sides of the axis of said driving disc to be driven in opposite directions thereby, a driven shaft connected to one of said driven discs, said driven discs being geared together whereby the direction of rotation of said driven shaft may be reversed, said driving and driven discs being inclined to each other to engage said ball at points other than the ends of a diameter thereof whereby said ball is in rolling contact with said disc when shifted with respect thereto.

7. In a power transmission, a driving element, a plurality of driven elements, each of said elements being provided with a disc, a single ball engaging said driving disc and operable into engagement with one or the other of said driven discs, said driven discs being disposed on opposite sides of the axis of said driving disc and inter-connected so as to be driven in opposite directions thereby, said driven discs being oppositely inclined relative to said driving discs to form oppositely disposed troughs, the discs of each trough engaging said ball at points other than the ends of a diameter thereof whereby said ball is in rolling contact with the discs of each trough when shifted with respect thereto, said ball being positioned with respect to said driving disc so that it is forced thereby into the narrow end of the respective trough on one side or the other of said driving axis.

8. In a power transmission, a driving element, a plurality of driven elements, each of said elements being provided with a disc, a single ball engaging said driving disc and operable into engagement with one or the other of said driven discs, said driven discs being disposed on opposite sides of the axis of said driving disc to be driven in opposite directions thereby, a driven shaft connected to one of said driven discs, said driven discs being geared together whereby the direction of rotation of said driven shaft may be reversed, said driven discs being oppositely inclined relative to said driving discs to form oppositely disposed troughs, the discs of each trough engaging said ball at points other than the ends of a diameter thereof whereby said ball is in rolling contact with the discs of each trough when shifted with respect thereto, said ball being positioned with respect to said driving disc so that it is forced thereby into the narrow end of the respective trough on one side or the other of said driving axis.

9. In a power transmission, a driving element, a plurality of driven elements, each of said elements being provided with a disc, a single ball engaging said driving disc and operable into engagement with one or the other of said driven discs, said driven discs being disposed on opposite sides of the axis of said driving disc and inter-connected so as to be driven in opposite directions thereby, said driving and driven discs being inclined to each other to engage said ball at points other than the ends of a diameter thereof whereby said ball is in rolling contact with said disc when shifted with respect thereto, and means for resiliently pressing said driving disc and the effective driven disc into engagement with said ball.

In testimony whereof I have affixed my signature.

MORTIMER F. BATES.